United States Patent
Hyoung et al.

(10) Patent No.: US 8,873,603 B2
(45) Date of Patent: Oct. 28, 2014

(54) METHOD AND APPARATUS FOR AMPLITUDE MODULATION OF SPREAD SIGNAL

(75) Inventors: Chang Hee Hyoung, Daejeon (KR); Sung Weon Kang, Daejeon (KR); In Gi Lim, Daejeon (KR); Jung Bum Kim, Daejeon (KR); Kyung Soo Kim, Daejeon (KR); Kyung Hwan Park, Daejeon (KR); Hyung-Il Park, Daejeon (KR); Tae Young Kang, Seoul (KR); Sung Eun Kim, Seoul (KR); Tae Wook Kang, Daejeon (KR); Jung Hwan Hwang, Daejeon (KR); Byoung Gun Choi, Daegu (KR); Youn Tae Kim, Daejeon (KR)

(73) Assignee: Electronics and Telecommunications Research Institute, Deajeon (KR)

( * ) Notice: Subject to any disclaimer, the term of this patent is extended or adjusted under 35 U.S.C. 154(b) by 143 days.

(21) Appl. No.: 13/564,618

(22) Filed: Aug. 1, 2012

(65) Prior Publication Data

US 2013/0034125 A1 Feb. 7, 2013

(30) Foreign Application Priority Data

Aug. 1, 2011 (KR) ........................ 10-2011-0076445
Jul. 9, 2012 (KR) ........................ 10-2012-0074511

(51) Int. Cl.
*H04B 1/707* (2011.01)

(52) U.S. Cl.
CPC ..................................... *H04B 1/707* (2013.01)

USPC .......................................................... 375/140

(58) Field of Classification Search
CPC . H04L 27/0008; H04L 27/32; H04L 27/3461; H04L 27/3483
USPC .................................. 375/140, 141, 145, 146
See application file for complete search history.

(56) References Cited

U.S. PATENT DOCUMENTS

| 5,073,899 | A | * | 12/1991 | Collier et al. | 375/135 |
| 5,115,450 | A | * | 5/1992 | Arcuri | 375/219 |
| 6,553,535 | B1 | * | 4/2003 | Asada et al. | 714/777 |
| 7,656,931 | B2 | * | 2/2010 | Smith et al. | 375/131 |
| 2004/0146090 | A1 | | 7/2004 | Sawada | |
| 2006/0291539 | A1 | * | 12/2006 | Tischler et al. | 375/146 |
| 2009/0103721 | A1 | * | 4/2009 | Sada et al. | 380/42 |

FOREIGN PATENT DOCUMENTS

KR 1020050022450 A 3/2005
KR 1020080114451 A 12/2008

* cited by examiner

*Primary Examiner* — Kevin Kim

(57) ABSTRACT

Disclosed are a method and an apparatus for amplitude modulation of a spread signal that can increase a data transmission rate and frequency use efficiency by loading information on the amplitude of the spread signal used in digital communications. A method for amplitude modulation of a spread signal according to an exemplary embodiment of the present disclosure includes: receiving a first data signal; generating a spread signal by applying a spreading code to the first data signal; receiving a second data signal; and outputting the spread signal at an amplitude corresponding to a value of the second data signal.

15 Claims, 7 Drawing Sheets

US 8,873,603 B2

METHOD AND APPARATUS FOR AMPLITUDE MODULATION OF SPREAD SIGNAL

CROSS-REFERENCE TO RELATED APPLICATIONS

This application is based on and claims priority from Korean Patent Application No. 10-2011-0076445, filed on Aug. 1, 2011 and Korean Patent Application No. 10-2012-0074511, filed on Jul. 9, 2012, with the Korean Intellectual Property Office, the disclosure of which is incorporated herein in its entirety by reference.

TECHNICAL FIELD

The present disclosure relates to a method and an apparatus that improves data transmission efficiency by modulating the amplitude of a spread signal used in digital communications.

BACKGROUND

Digital signals have been widely used in various wired and wireless communications, and in recent years, a communication system has also been researched, which directly transmits the digital signals without using a carrier through a human body and at close range.

In general, in order to ensure stable signal transmission and robustness of a signal under a channel environment with noise and an interference signal, a method of spreading a digital signal having information to be transmitted in predetermined multiple is used. A digital carrier or a spreading code is used to spread the digital signal, and in a CDMA system which is widely known, orthogonality is provided between the spreading codes to discriminate a plurality of channels using the same frequency band.

However, since the above spread signal occupies a bandwidth wider than an original signal, frequency use efficiency deteriorates and a data transmission rate also decreases under the same clock.

SUMMARY

The present disclosure has been made in an effort to provide a method and an apparatus for amplitude modulation of a spread signal that can increase a data transmission rate and frequency use efficiency by loading information on the amplitude of the spread signal used in digital communications.

An exemplary embodiment of the present disclosure provides a method for amplitude modulation of a spread signal including: receiving a first data signal; generating a spread signal by applying a spreading code to the first data signal; receiving a second data signal; and outputting the spread signal at an amplitude corresponding to a value of the second data signal.

Another exemplary embodiment of the present disclosure provides a method for amplitude modulation of a spread signal including: receiving a first data signal; generating a spread signal by applying a spreading code to the first data signal; dividing the spread signal into a plurality of sub spread signals; receiving second data signals corresponding to the plurality of sub spread signals, respectively; and outputting the plurality of sub spread signals at amplitudes corresponding to values of the second data signals.

When the number of bits of the second data signal is M, the plurality of sub spread signals may be outputted at $2^M$ different amplitudes.

Each of the plurality of sub spread signals may be constituted by a plurality of chips, and the plurality of chips constituting one sub spread signal may be outputted at the same amplitude corresponding to the value of the second data signal.

Yet another exemplary embodiment of the present disclosure provides an apparatus for amplitude modulation of a spread signal including: a spreading unit configured to generate a spread signal by receiving a first data signal and applying a spreading code to the first data signal; and an amplitude modulating unit configured to receive the spread signal and a second data signal and output the spread signal at an amplitude corresponding to a value of the second data signal.

The amplitude modulating unit may divide the spread signal into a plurality of sub spread signals and output the plurality of sub spread signals at amplitudes corresponding to a value of the second data signal.

According to the present disclosure, the information is loaded by dividing a section of the spread signal used in the digital communications and subdividing the amplitude thereof into two or more levels, thereby transmitting more data under the same clock and frequency band.

In the case of the wired communication, the data transmission rate and communication speed can be significantly increased while maintaining compatibility with the existing system by using the existing transmission line as it is.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

The aforementioned objects, features, and advantages will be described in detail with reference to the accompanying drawings, and thus those skilled in the art will be able to work the spirit of the present disclosure. In describing the present disclosure, well-known constructions or functions will not be described in detail when it is judged that they may unnecessarily obscure the understanding of the present disclosure. Hereinafter, exemplary embodiments of the present disclosure will be described in detail with reference to the accompanying drawings.

Figure 1:
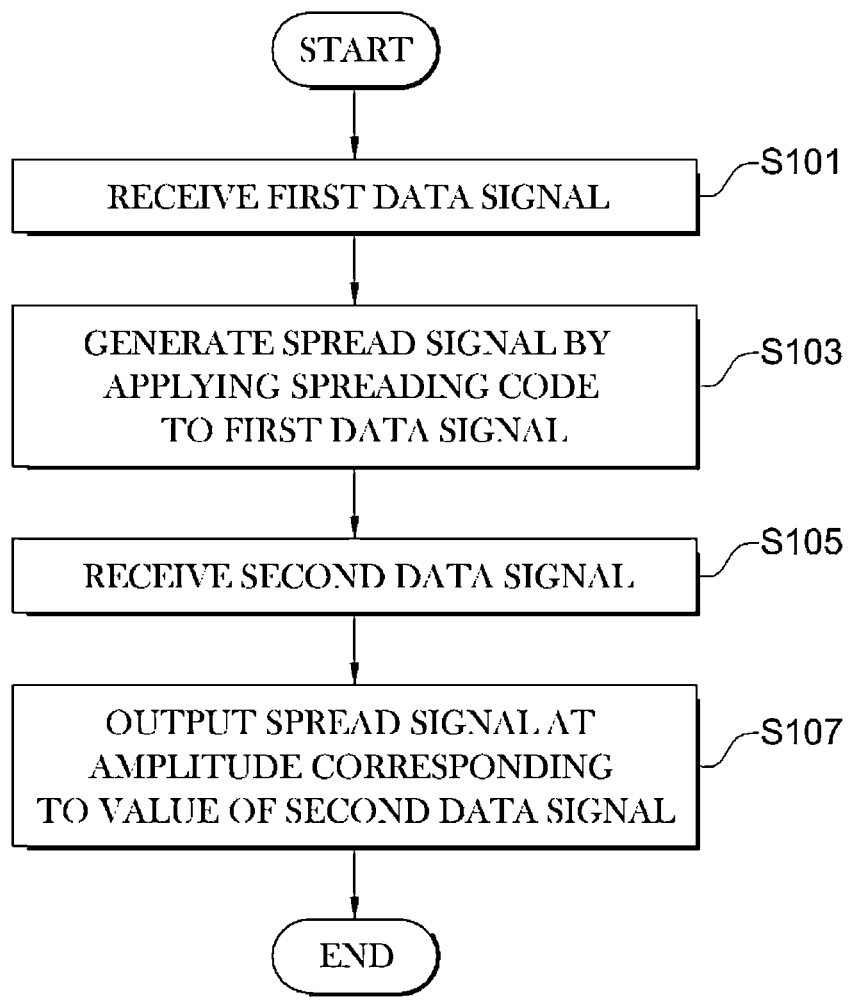
FIG. 1 is a flowchart of a method for amplitude modulation of a spread signal according to an exemplary embodiment of the present disclosure.
Figure 2A:
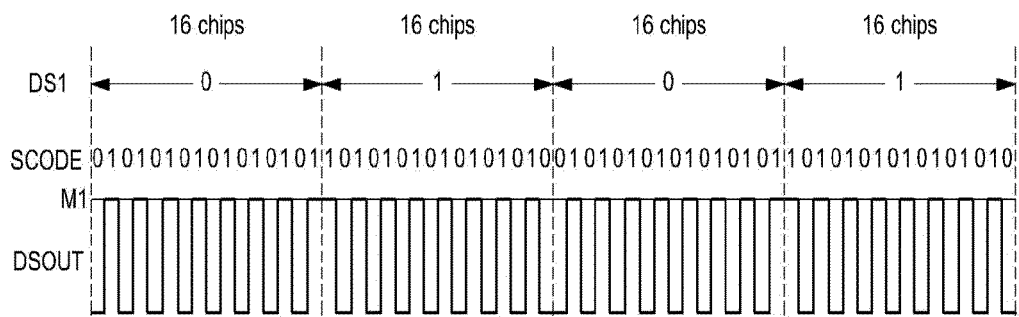
FIGS. 2A and 2B are diagrams illustrating a waveform of the spread signal modulated according to the exemplary embodiment of FIG. 1.
Figure 2B:
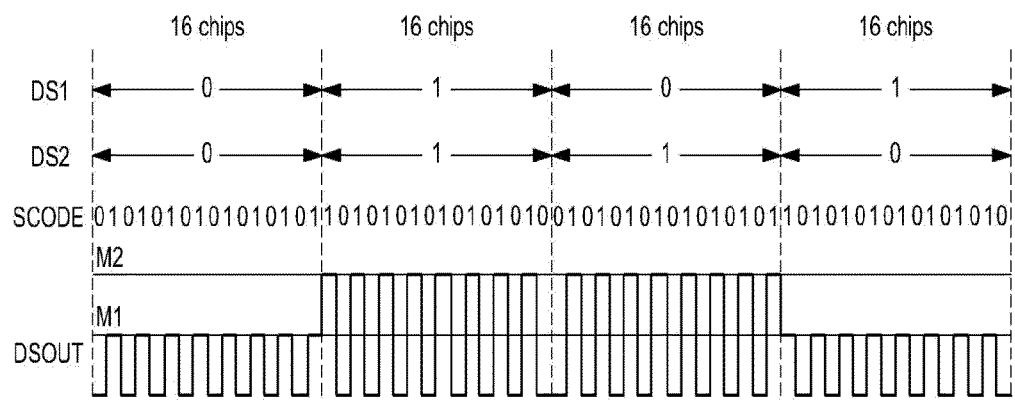

FIG. 1 is a flowchart of a method for amplitude modulation of a spread signal according to an exemplary embodiment of the present disclosure. FIGS. 2A and 2B are diagrams illustrating a waveform of the spread signal modulated according to the exemplary embodiment of FIG. 1.

Referring to FIGS. 1, 2A and 2B, the method for amplitude modulation of a spread signal according to an exemplary embodiment of the present disclosure includes receiving a first data signal DS1 (S101), generating a spread signal SCODE by applying a spreading code to the first data signal DS1 (S103), receiving a second data signal DS2 (S105) and outputting the generated spread signal SCODE at amplitudes M1 and M2 corresponding to values of the second data signal DS2 (S107).

FIG. 2A illustrates the spread signal SCODE acquired by spreading the first data signal DS1 in 16 multiples. 1-bit information of the first data signal DS1 is expressed as 16 chips of the spread signal SCODE and bit values 0 and 1 of the first data signal DS1 are expressed as signals having a phase difference of 180°. The digital modulation system has a frequency modulated characteristic through a mixer in an RF circuit by shifting information to a desired band by using digital carriers without modulating a frequency. However, a lot of harmonic components are included because not analog carriers but the digital carriers are used, and may be removed through a filter.

FIG. 2B illustrates the amplitude of the spread signal SCODE that is spread in 16 multiples and thus expresses the 1 bit information of the first data signal DS1, which further includes 1 bit information of the second data signal DS2. Referring to FIG. 2B, when a bit value of the second data signal DS2 is 0, the amplitude of the spread signal SCODE is M1, and when the bit value of the second data signal DS2 is 1, the amplitude of the spread signal SCODE is M2. That is, information of the first data signal DS1 is expressed as a phase of the spread signal SCODE, and information of the second data signal DS2 is expressed as the amplitude of the spread signal SCODE. As such, the data transmission rate may be increased twice by expressing all information in the phase and the amplitude while using the same frequency band.

Figure 3:
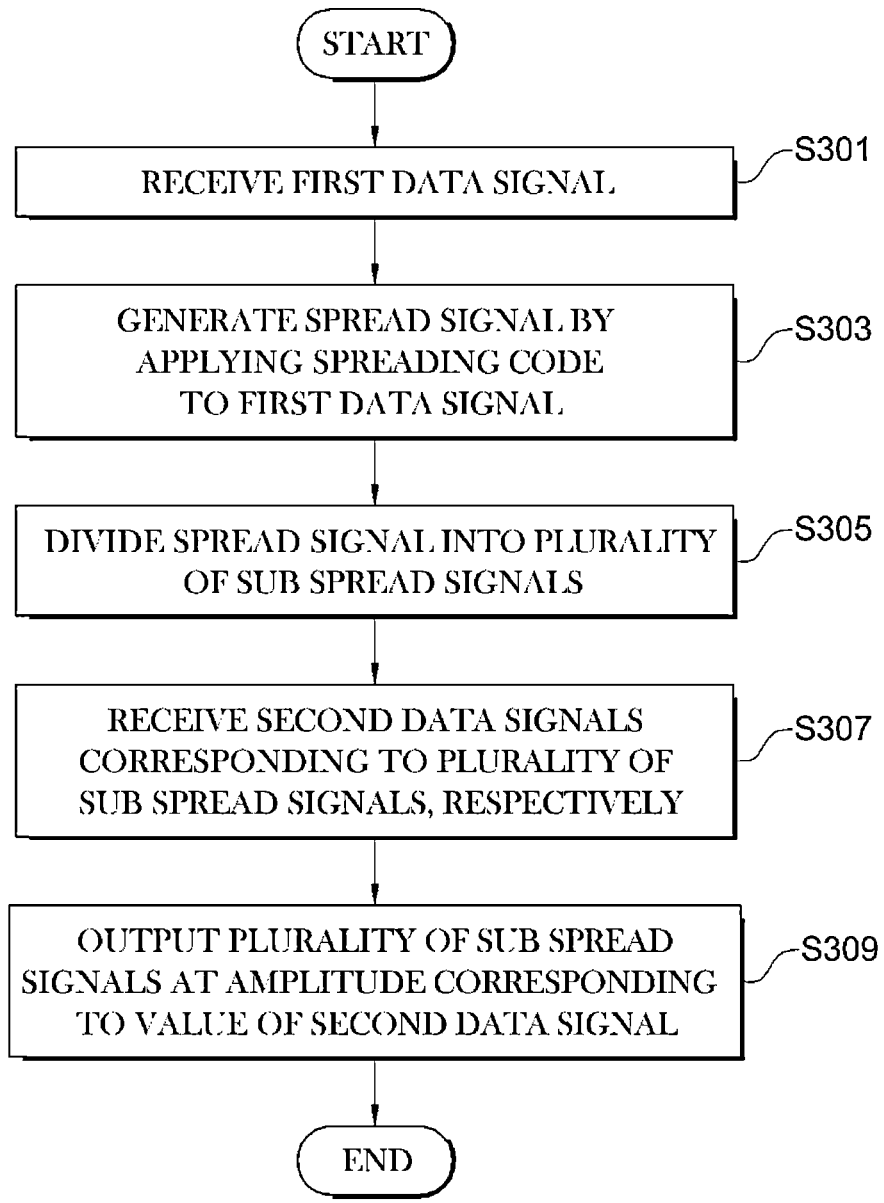
FIG. 3 is a flowchart of a method for amplitude modulation of a spread signal according to another exemplary embodiment of the present disclosure.
Figure 4A:
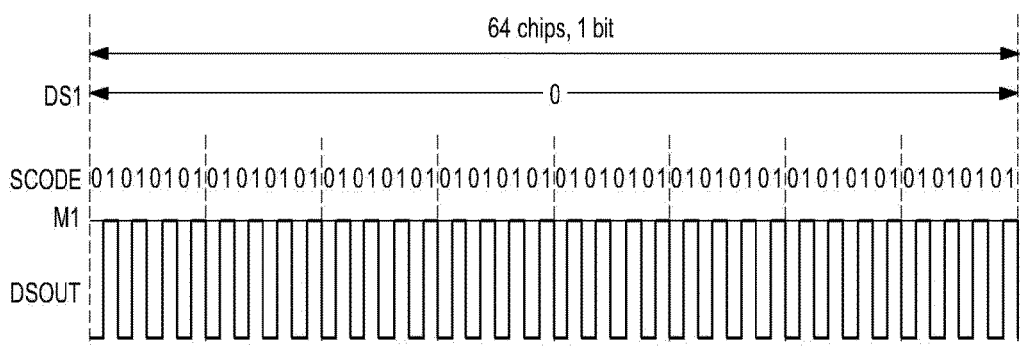
FIGS. 4A to 4C are diagrams illustrating a waveform of the spread signal modulated according to the exemplary embodiment of FIG. 3.
Figure 4B:
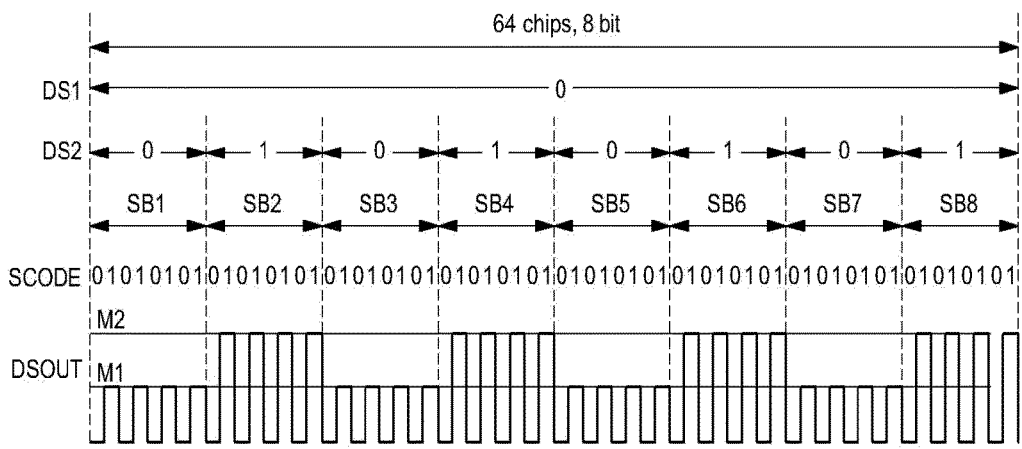
Figure 4C:
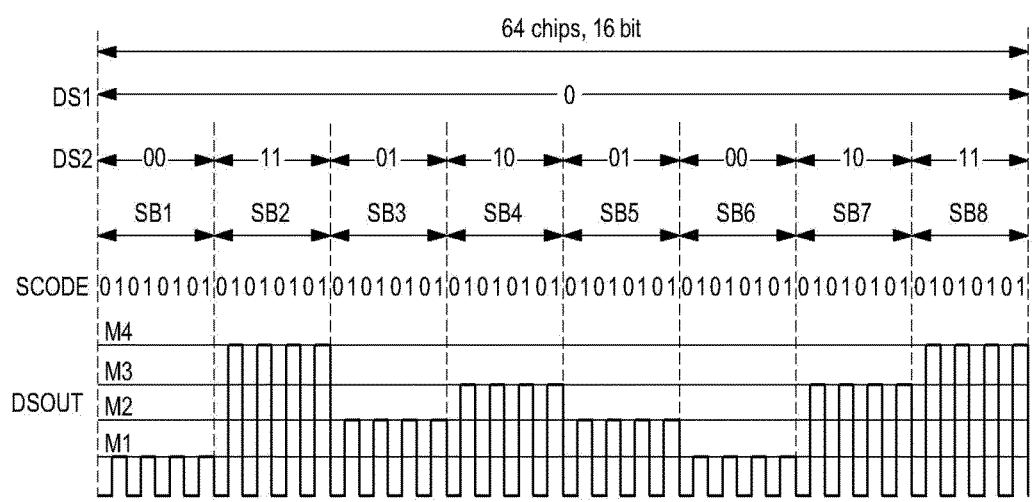

FIG. 3 is a flowchart of a method for amplitude modulation of a spread signal according to another exemplary embodiment of the present disclosure. FIGS. 4A to 4C are diagrams illustrating a waveform of the spread signal modulated according to the exemplary embodiment of FIG. 3.

Referring to FIGS. 3 and 4A to 4C, a method for amplitude modulation of a spread signal according to another exemplary embodiment of the present disclosure includes receiving a first data signal DS1 (S301), generating a spread signal SCODE by applying a spreading code to the first data signal DS1 (S303), dividing the generated spread signal SCODE into a plurality of sub spread signals SB1 to SB8 (S305), receiving second data signals DS2 corresponding to the plurality of sub spread signals SB1 to SB8, respectively (S307) and outputting the plurality of sub spread signals SB1 to SB8 at amplitudes M1 to M4 corresponding to values of the second data signals DS2 (S309).

FIG. 4A illustrates a spread signal SCODE expressed as 64 chips by spreading the 1 bit information of the first data signal DS1 in 64 multiples.

FIGS. 4B and 4C illustrate a method in which the spread signal SCODE spread in 64 multiples is divided into 8 sub spread signals SB1 to SB8 configured by 8 chips, respectively, and 8 chips constituting one sub spread signal have the same amplitude to express additional information in the spreading code. That is, the respective sub spread signals SB1 to SB8 have amplitudes corresponding to the values of the second data signals DS2 to further include the information of the second data signal DS2 in one spread signal SCODE that expresses the information of the first data signal DS1.

In this case, when the number of bits of the second data signal DS2 is M, the plurality of sub spread signals SB1 to SB8 are outputted at $2^M$ different amplitudes. In FIG. 4B, the second data signal DS2 is 1 bit, and when the bit value is 0 and 1, the outputted amplitudes are M1 and M2, respectively. In FIG. 4C, the second data signal DS2 is 2 bits, and when the bit value is 00, 01, 10 and 11, the outputted amplitudes are M1, M2, M3 and M4, respectively. Through the amplitude modulation method, total 8-bit information may be expressed in one spreading code in FIG. 4B and total 16-bit information may be expressed in FIG. 4C.

Figure 5A:
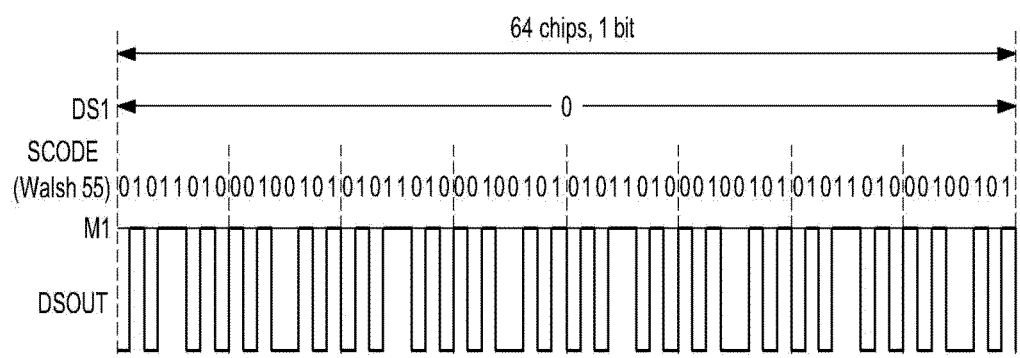
FIGS. 5A to 5C are diagrams illustrating a waveform of a spread signal modulated by a representative spreading code having orthogonality in the exemplary embodiment of FIG. 3.
Figure 5B:
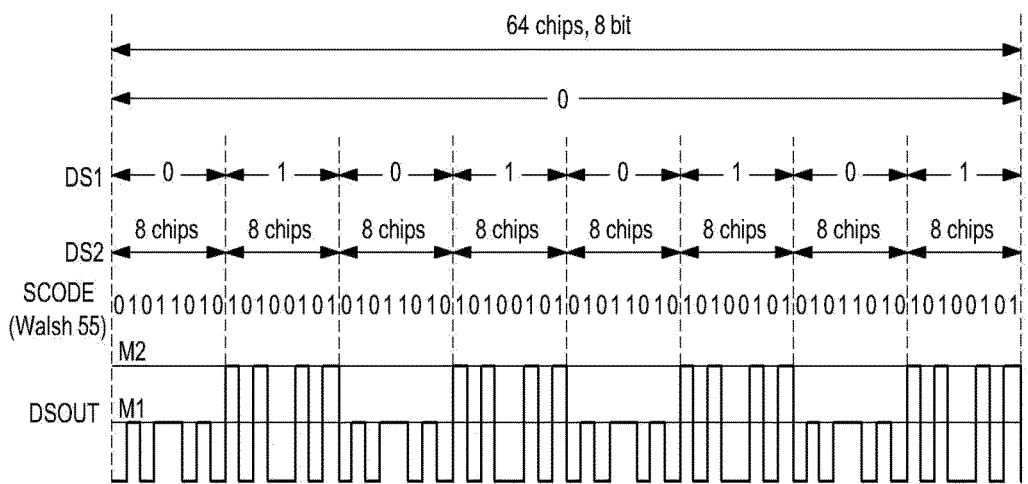
Figure 5C:
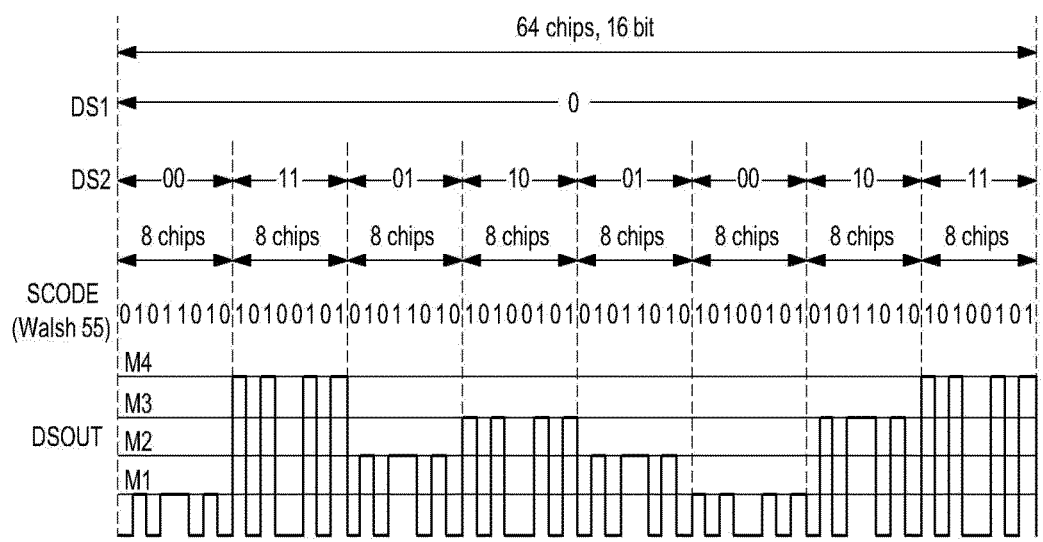

FIGS. 4A to 4C illustrate the method using the digital carrier as the spreading code, while FIGS. 5A to 5C are diagrams illustrating a waveform of a spread signal modulated by a representative spreading code having orthogonality in the exemplary embodiment of FIG. 3.

FIG. 5A illustrates a spread signal SCODE acquired by spreading the 1 bit information in 64 multiples by applying a Walsh code 55, and FIGS. 5B and 5C illustrate a state in which the spread signal SCODE having orthogonality is outputted at two amplitudes M1 and M2 and four amplitudes M1, M2, M3 and M4, respectively to express 8-bit information and 16-bit information in codes having the same length.

Meanwhile, in the exemplary embodiment of FIGS. 4A to 4C and FIGS. 5A to 5C, only the case where the bit value of the first data signal DS1 is 0 is expressed, and in a communication channel having a narrow-band characteristic, one spreading code is used and the phase is inverted to express an input signal. That is, in the case where the bit value of the first data signal DS1 is 1, each signal may be expressed to have a phase difference of 180° from the figure.

Only the case where the 1 bit information of the first data signal DS1 is spread in 64 multiples is expressed in the above exemplary embodiment, but a plurality of bit information may also be spread to one of a plurality of spreading codes. For example, in the case where one symbol is configured by 3-bit information, information of 3 bits inputted in parallel is outputted as one symbol signal through a symbol mapper and the respective symbols may correspond to 8 different spreading codes having orthogonality. The number of the sub spread signals into which one spread signal is divided, that is, the number of sections outputted at the same amplitude and the number of amplitudes may vary according to a state of a channel, and a spread gain (processing gain) may be acquired through repetition of amplitude information throughout one bit or several bits.

Figure 6:
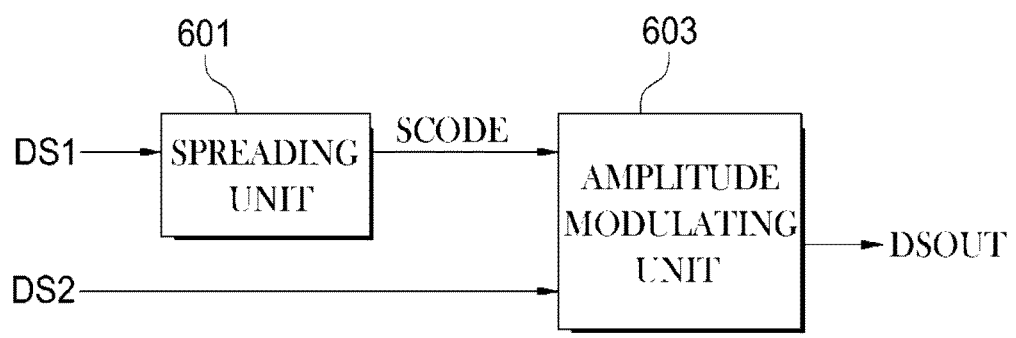
FIG. 6 is a configuration diagram of an apparatus for amplitude modulation of a spread signal according to an exemplary embodiment of the present disclosure.

FIG. 6 is a configuration diagram of an apparatus for amplitude modulation of a spread signal according to an exemplary embodiment of the present disclosure.

Referring to FIG. 6, the apparatus for amplitude modulation of a spread signal according to the exemplary embodiment of the present disclosure includes a spreading unit 601 configured to generate a spread signal SCODE by receiving a first data signal DS1 and applying a spreading code to the first data signal DS1 and an amplitude modulating unit 603 configured to receive the generated spread signal SCODE and a second data signal DS2 and output the spread signal SCODE at amplitudes corresponding to values of the second data signal DS2.

The spreading unit 601 may generate the spread signal SCODE by applying a spreading code to spread the first data signal DS1 with a predetermined spreading factor ($2^N$, N: integer). In this case, one spreading code may be applied to 1-bit information of the first data signal DS1 or different spreading codes having orthogonality may be applied to respective symbols by using a plurality of bits (for example, 3 bits) information as one symbol. The amplitude modulating unit 603 may divide the spread signal SCODE into a plurality of sub spread signals and output the plurality of sub spread signals at amplitudes depending on values of the second data signal DS2, which correspond thereto. In this case, when the number of bits of the second data signal DS2 is M, the spread signal SCODE may be outputted at $2^M$ different amplitudes. Each of the plurality of sub spread signals may be constituted by a plurality of chips, and the plurality of chips constituting one sub spread signal may be outputted at the same amplitude corresponding to the value of the second data signal DS2. In the case where the spread signal SCODE is the signal to spread the first data signal DS1 in 64 multiples, each of the plurality of sub spread signals is constituted by 8 chips to be divided into total 8 sub spread signals.

A more detailed amplitude modulation method of the spread signal SCODE is the same as described through FIGS. 1 to 5C.

When the method for amplitude modulation of a spread signal according to the present disclosure is used, the data transmission rate may be changed variously under the same frequency band. This method may be widely used even in a wireless communication system and a wired communication system. Wired communication has a physical communication channel unlike wireless communication and generally has a connected ground line. In the case of the wired communication, in general, a lot of lines are placed together with construction of a building, and once the lines are installed, it is very difficult to change the lines in order to increase a capacity. Therefore, when the amplitude modulation method according to the present disclosure is used, much more data may be transmitted through the existing transmission line having a limited transmission bandwidth, which is very useful. When the present disclosure is used in communication and broadcasting through a coaxial cable, perfect compatibility even with the existing method having the same amplitude may be maintained while higher-definition data and image service may be provided only by replacing a terminal.

Figure 7:
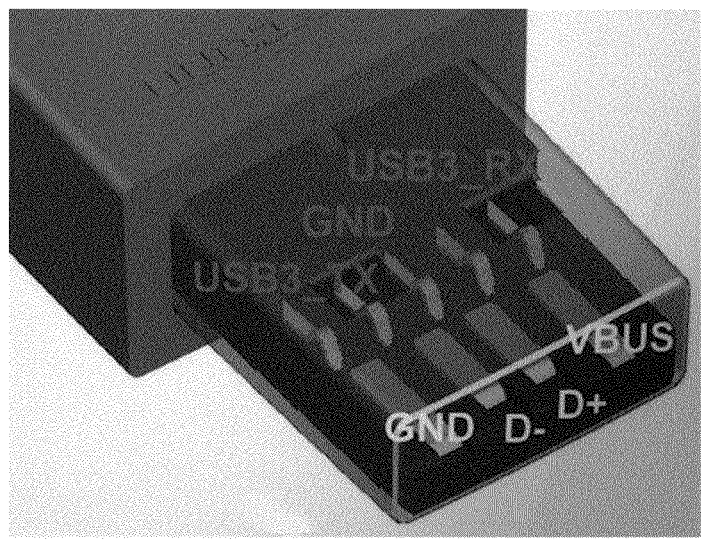
FIG. 7 is a configuration diagram of a USB 3.0 connector.

In a USB technique which is widely used in various mobile apparatuses at present, a final plan of a USB 3.0 standard has been decided, and a cable and a device supporting the standard have emerged. FIG. 7 is a diagram illustrating a configuration of a USB 3.0 connector and illustrates that transmission lines USB3_TX, GND and USB3_RX are added for high-speed transmission while the existing transmission lines GND, D−, D+ and VBUS are provided in order to maintain compatibility with a USB 2.0. However, in order to use the added transmission lines, the device and the transmission lines need to be replaced, which may cause confusion and inconvenience to a user. In this case, when the technique of the present disclosure is applied, much more information may be simultaneously transmitted through the existing transmission lines by replacing only a controller chip without changing the cable. The wired communication has the ground connection and thus is more excellent than the wireless communication in resolution performance of the amplitude while reception, and when a differential signal is used, the wired communication is less influenced by external interference, and thus the amount of information which may be loaded on the amplitude is increased in two multiples in the case of two levels and in four multiples in the case of four levels, theoretically. Compatibility with the existing method may be maintained and high-speed communication may be implemented by varying the amplitude at the same cycle as the clock or at a cycle acquired by dividing the clock without varying the clock used in the digital communication. The present disclosure may be applied to all methods that perform the digital communication by using a clock such as SATA, IEEE 1394, or the like as well as the USB type.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for amplitude modulation of a spread signal, the method comprising:
   receiving a first data signal including first information for transmitting;
   generating a spread signal by applying a spreading code to the first data signal;
   receiving a second data signal including second information for transmitting and being distinct from the spread signal; and
   outputting the spread signal at an amplitude corresponding to a bit value of the second data signal,
   wherein outputting the spread signal includes:
       dividing the spread signal into a plurality of sub spread signals; and
       outputting the plurality of sub spread signals at amplitudes corresponding to bit values of the second data signal, respectively.

2. The method for amplitude modulation of a spread signal of claim 1, wherein:
   when the number of bits of a bit value of the second data signal is M, the spread signals are outputted at $2^M$ different amplitudes.

3. The method for amplitude modulation of a spread signal of claim 2, wherein:
   the spreading code spreads the first data signal at a predetermined spreading factor $2^N$, and
   the number of bits of a bit value of the second data signal is 1 or 2.

4. A method for amplitude modulation of a spread signal, the method comprising:
   receiving a first data signal;
   generating a spread signal by applying a spreading code to the first data signal;
   dividing the spread signal into a plurality of sub spread signals;
   receiving a second data signal having bit values corresponding to the plurality of sub spread signals, respectively; and
   outputting the plurality of sub spread signals at amplitudes corresponding to the bit values of the second data signal, respectively.

5. The method for amplitude modulation of a spread signal of claim 4, wherein:

when the number of bits of each bit value of the second data signal is M, the plurality of sub spread signals are outputted at $2^M$ different amplitudes.

6. The method for amplitude modulation of a spread signal of claim 5, wherein:
the spreading code spreads the first data signal at a predetermined spreading factor $2^N$, and
the number of bits of each bit value of the second data signal is 1 or 2.

7. The method for amplitude modulation of a spread signal of claim 4, wherein:
each of the plurality of sub spread signals is constituted by a plurality of chips and the plurality of chips constituting one sub spread signal is outputted at the same amplitude corresponding to a bit value of the second data signal.

8. The method for amplitude modulation of a spread signal of claim 7, wherein:
when the spreading code spreads the first data signal in 64 multiples, each of the plurality of sub spread signals is constituted by 8 chips and one spread signal is divided into total 8 sub spread signals.

9. The method for amplitude modulation of a spread signal of claim 4, wherein:
in the generating of the spread signal, one of a plurality of spreading codes having orthogonality is applied to each symbol by using a plurality of bit values of the first data signal as one symbol.

10. An apparatus for amplitude modulation of a spread signal, the apparatus comprising:
a spreading unit configured to generate a spread signal by receiving a first data signal including first information for transmitting and applying a spreading code to the first data signal; and
an amplitude modulating unit configured to receive the spread signal and a second data signal, which includes second information for transmitting and is distinguished from the spread signal, and to output the spread signal at an amplitude corresponding to a bit value of the second data signal,
wherein the amplitude modulating unit divides the spread signal into a plurality of sub spread signals and outputs the plurality of sub spread signals at amplitudes corresponding to bit values of the second data signal, respectively.

11. The apparatus for amplitude modulation of a spread signal of claim 10, wherein:
when the number of bits of each bit value of the second data signal is M, the plurality of sub spread signals are outputted at $2^M$ different amplitudes.

12. The apparatus for amplitude modulation of a spread signal of claim 10, wherein:
the spreading code spreads the first data signal at a predetermined spreading factor $2^N$, and
the number of bits of each bit value of the second data signal is 1 or 2.

13. The apparatus for amplitude modulation of a spread signal of claim 10, wherein:
each of the plurality of sub spread signals is constituted by a plurality of chips and the plurality of chips constituting one sub spread signal is outputted at the same amplitude corresponding to a bit value of the second data signal.

14. The apparatus for amplitude modulation of a spread signal of claim 13, wherein:
when the spread signal spreads the first data signal in 64 multiples, each of the plurality of sub spread signals is constituted by 8 chips and one spread signal is divided into total 8 sub spread signals.

15. The apparatus for amplitude modulation of a spread signal of claim 10, wherein:
the spreading unit applies one of a plurality of spreading codes having orthogonality to each symbol by using a plurality of bit values of the first data signal as one symbol.

* * * * *